United States Patent
Ogawa

(10) Patent No.: US 9,444,989 B2
(45) Date of Patent: Sep. 13, 2016

(54) IMAGE PICKUP APPARATUS, IMAGE PICKUP SYSTEM, SIGNAL PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 14/200,151

(22) Filed: Mar. 7, 2014

(65) Prior Publication Data
US 2014/0253786 A1    Sep. 11, 2014

(30) Foreign Application Priority Data
Mar. 11, 2013  (JP) .................. 2013-047442

(51) Int. Cl.
*H04N 5/232* (2006.01)
*H04N 5/357* (2011.01)
*H04N 5/369* (2011.01)
*G02B 7/28* (2006.01)
*G02B 7/34* (2006.01)

(52) U.S. Cl.
CPC ............ *H04N 5/23212* (2013.01); *G02B 7/28* (2013.01); *G02B 7/346* (2013.01); *H04N 5/3572* (2013.01); *H04N 5/3696* (2013.01)

(58) Field of Classification Search
USPC ....................................... 348/350
See application file for complete search history.

(56) References Cited

U.S. PATENT DOCUMENTS

| 6,597,868 B2 | 7/2003 | Suda |
| 6,829,008 B1 | 12/2004 | Kondo et al. |
| 8,576,329 B2 | 11/2013 | Takamiya |
| 2010/0157094 A1* | 6/2010 | Takamiya .......... H04N 5/23212 348/229.1 |
| 2013/0335547 A1 | 12/2013 | Ogawa |

FOREIGN PATENT DOCUMENTS

| JP | 2000-156823 A | 6/2000 |
| JP | 2001-305415 A | 10/2001 |
| JP | 2010-140013 A | 6/2010 |

OTHER PUBLICATIONS

U.S. Appl. No. 14/149,082, filed Jan. 7, 2014.

* cited by examiner

*Primary Examiner* — Mark Monk
(74) *Attorney, Agent, or Firm* — Fitzpatrick, Cella, Harper & Scinto

(57) ABSTRACT

An image pickup apparatus includes an image pickup element including a plurality of focus detection pixels configured to generate a pair of image signals based on light beams passing through pupil regions different from each other in an image pickup optical system, a detection unit configured to detect a base line length of the plurality of focus detection pixels and a pupil division direction based on position information of a focus detection region in the image pickup element and information relating to the image pickup optical system, and a calculation unit configured to calculate a phase difference in the pupil division direction by using the pair of image signals.

13 Claims, 9 Drawing Sheets

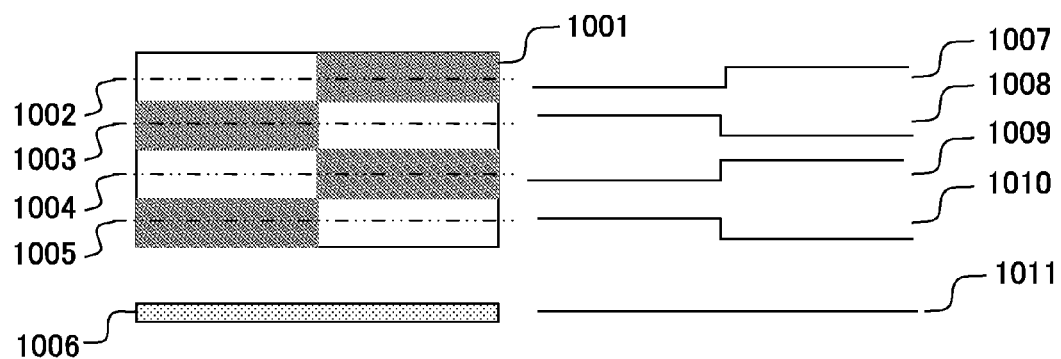
FIG. 10
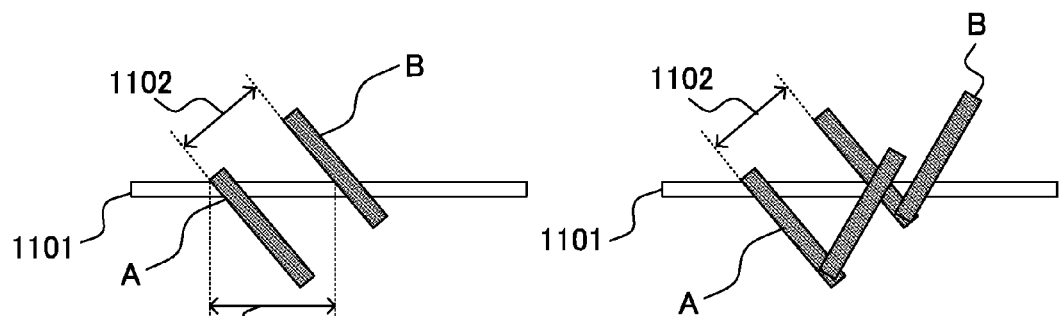
FIG. 11A
FIG. 11C
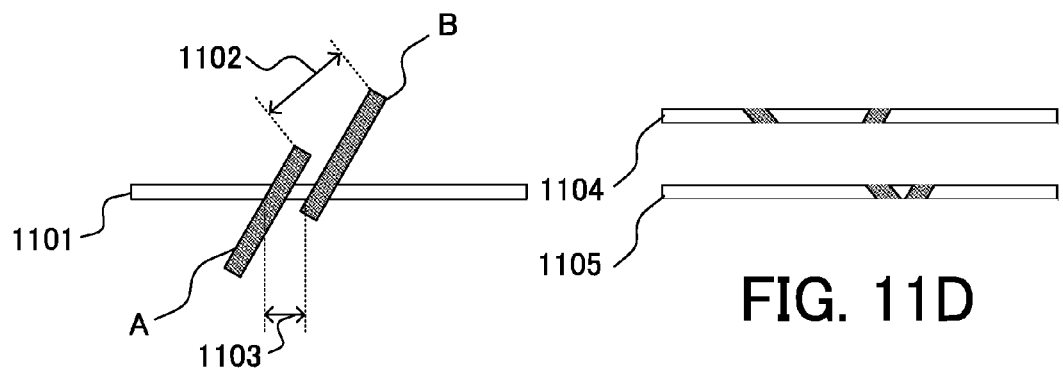
FIG. 11B
FIG. 11D

IMAGE PICKUP APPARATUS, IMAGE PICKUP SYSTEM, SIGNAL PROCESSING APPARATUS, AND NON-TRANSITORY COMPUTER-READABLE STORAGE MEDIUM

BACKGROUND OF THE INVENTION

1. Field of the Invention

The present invention relates to an image pickup apparatus which performs focus detection using light beams passing through pupil regions different from each other in an image pickup optical system.

2. Description of the Related Art

Previously, a focus detection method of using a phase difference detection method has been known. In the phase difference detection method, a light beam passing through an exit pupil of a lens is divided, and the divided light beams are received by a pair of focus detection sensors. Then, a drive amount of the lens required to achieve an in-focus state is obtained based on a shift amount of signals outputted depending on light receiving amounts of the divided light beams, i.e. a relative position shift amount of the light beams in a division direction. Accordingly, since an amount and direction of defocus is obtained when an accumulation is performed once by the focus detection sensors, a focusing can be performed at high speed.

Japanese Patent Laid-open No. 2000-156823 (paragraphs 0075-0079, and FIGS. 3 and 4, etc.) discloses a configuration in which a sensitive region of a light receiving portion is decentered with respect to an optical axis of an on-chip microlens in apart of light receiving elements (pixels) of an image pickup element to provide a pupil division function. These pixels are treated as focus detection pixels and are arranged, at predetermined intervals, between image pickup pixels in which a sensitive region of alight receiving portion is not decentered, to perform focus detection by the phase difference method. Since the region where the focus detection pixels are arranged is a defect section of the image pickup pixels, image information is interpolated by using information obtained from peripheral image pickup pixels.

Japanese Patent Laid-open No. 2001-305415 (paragraphs 0052-0056, and FIGS. 7 and 8, etc.) discloses a configuration in which a part of light receiving portions of pixels in an image pickup element is divided to provide a pupil division function. It also discloses a configuration in which outputs of the divided light receiving portions are independently processed to perform focus detection by a phase difference method and the outputs of the divided light receiving portions are added to be used as an image pickup signal.

Japanese Patent Laid-open No. 2010-140013 discloses a configuration in which images are added in an oblique direction considering an influence of vignetting to be able to perform focus detection for a periphery in a screen as well.

However, in each of the configurations disclosed in Japanese Patent Laid-open No. 2000-156823, Japanese Patent Laid-open No. 2001-305415, and Japanese Patent Laid-open No. 2010-140013, since the focus detection is performed by using one-dimensional image, it is weak in an object image with a repeated pattern, and an error remains, which is caused by influences of an adding direction of generating an image and an oblique line component included in the object. Therefore, particularly a focus detection accuracy in the periphery of the screen is deteriorated.

BRIEF SUMMARY OF THE INVENTION

The present invention provides an image pickup apparatus, an image pickup system, a signal processing apparatus, and a non-transitory computer-readable storage medium which are capable of performing highly-accurate focus detection while avoiding an influence caused by a shape of an object or vignetting.

An image pickup apparatus as one aspect of the present invention includes an image pickup element including a plurality of focus detection pixels configured to generate a pair of image signals based on light beams passing through pupil regions different from each other in an image pickup optical system, a detection unit configured to detect a base line length of the plurality of focus detection pixels and a pupil division direction based on position information of a focus detection region in the image pickup element and information relating to the image pickup optical system, and a calculation unit configured to calculate a phase difference in the pupil division direction by using the pair of image signals.

An image pickup system as another aspect of the present invention includes an image pickup optical system and the image pickup apparatus.

A signal processing apparatus as another aspect of the present invention includes an image signal generating unit configured to generate a pair of image signals based on light beams passing through pupil regions different from each other in an image pickup optical system, a detection unit configured to detect a base line length of a focus detection portion and a pupil division direction based on position information of a focus detection region and information relating to the image pickup optical system, and a calculation unit configured to calculate a phase difference in the pupil division direction by using the pair of image signals.

A non-transitory computer-readable storage medium as another aspect of the present invention stores a program, and the program causes a computer to execute a process that includes generating a pair of image signals based on light beams passing through pupil regions different from each other in an image pickup optical system, detecting a base line length of a focus detection portion and a pupil division direction based on position information of a focus detection region and information relating to the image pickup optical system, and calculating a phase difference in the pupil division direction by using the pair of image signals.

Further features and aspects of the present invention will become apparent from the following description of exemplary embodiments with reference to the attached drawings.

BRIEF DESCRIPTION OF THE DRAWINGS

FIG. 10 is a diagram of illustrating a situation where a checked object exists in a focus detection field of view in each of the embodiments.

FIGS. 11A to 11D are diagrams of illustrating a relation between a pupil division in an oblique direction and an oblique line in each of the embodiments.

DESCRIPTION OF THE EMBODIMENTS

Figure 1:
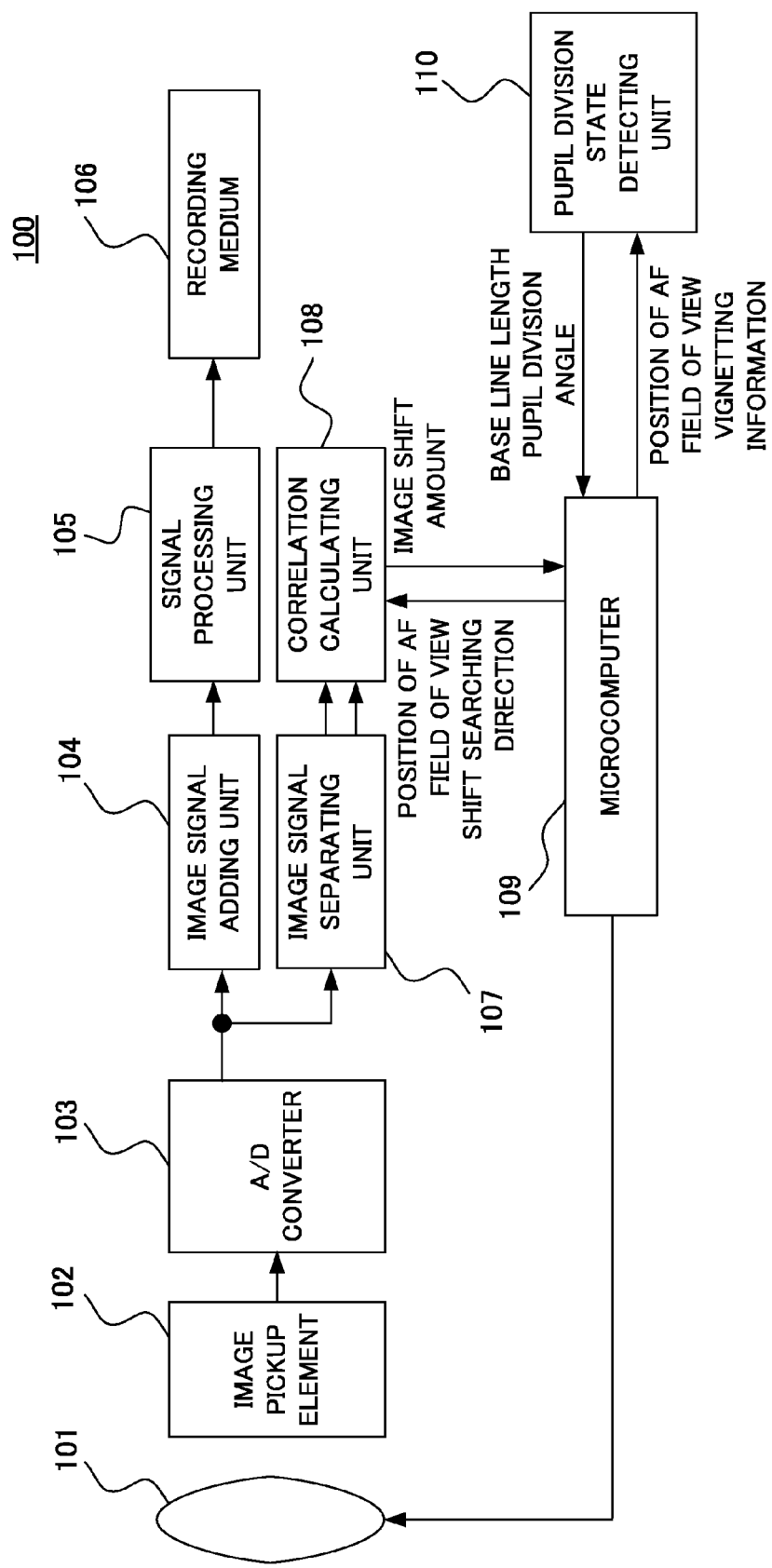
FIG. 1 is a block diagram of an image pickup apparatus in each of Embodiment 1 and 2.

Exemplary embodiments of the present invention will be described below with reference to the accompanied drawings. In each of the drawings, the same elements will be denoted by the same reference numerals and the descriptions thereof will be omitted.

Figure 2:
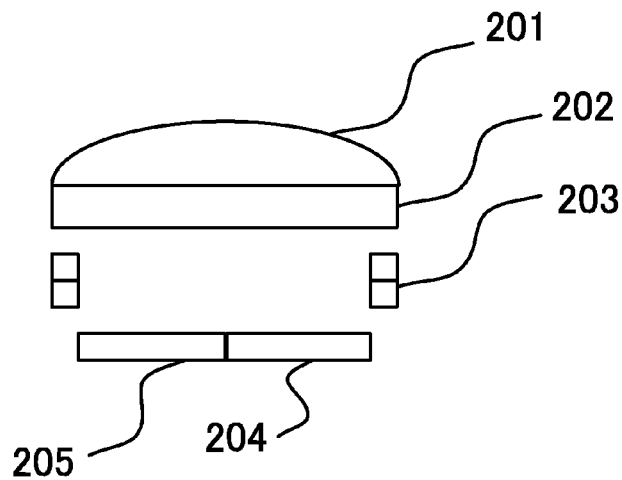
FIG. 2 is a cross-sectional view of a pixel of an image pickup element in the present embodiment (Embodiment 1).

First of all, referring to FIG. 2, a structure of a pixel of an image pickup element in the present embodiment will be described. FIG. 2 is a cross-sectional view of the pixel of the image pickup element in the present embodiment. In FIG. 2, reference numeral 201 denotes a microlens, reference numeral 202 denotes a color filter, reference numeral 203 denotes a wiring layer (a semiconductor wiring layer), and reference numerals 204 and 205 denote photoelectric conversion portions. Thus, two photoelectric conversion portions 204 and 205 are provided for one microlens 201, and therefore images (an A image and a B image) in which a pupil is divided to the left and right can be obtained. When an output of the photoelectric conversion portion 204 is added to an output of the photoelectric conversion portion 205, an output equivalent to a normal pixel output can be obtained. In the present embodiment, a pixel value obtained by adding the outputs of the photoelectric conversion portions 204 and 205 is used to generate an image pickup signal.

Figure 5A:
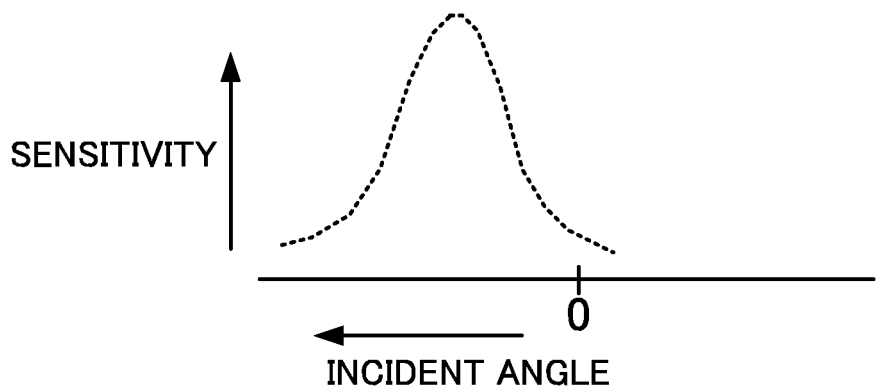
FIGS. 5A and 5B are diagrams of a pupil intensity distribution of the image pickup element in the present embodiment (Embodiment 1).
Figure 5B:
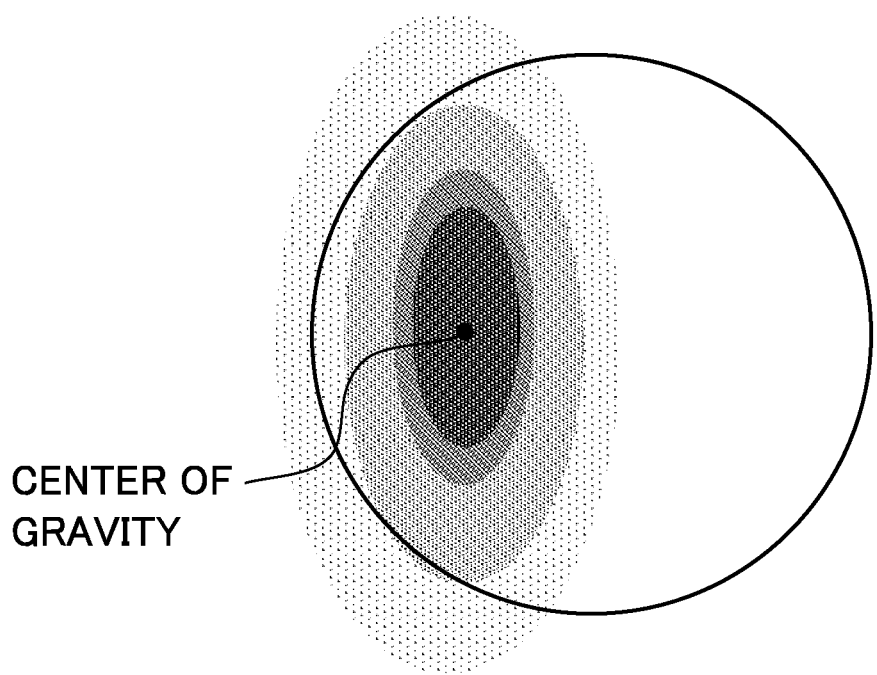

Subsequently, referring to FIGS. 5A and 5B, a pupil intensity distribution of the image pickup element will be described. FIG. 5A is a graph of illustrating a pupil intensity distribution of the photoelectric conversion portion 204, in which a horizontal axis indicates an incident angle of light with respect to a pixel and a vertical axis indicates a sensitivity of the photoelectric conversion. As illustrated in FIG. 5A, with reference to an incident angle of 0 degree, a strong intensity is obtained at the right side. FIG. 5B is a diagram of expressing the incident angle in a plane and the sensitivity by a color density. A point in FIG. 5B indicates a center of gravity of the sensitivity, and thus the center of gravity of the sensitivity of the photoelectric conversion portion 204 is displaced (shifted) to the left side relative to the center. The center of gravity of the photoelectric conversion portion 205 (not shown) is displaced to the right side relative to the center. In the present embodiment, a base line length is determined based on a distance between the two centers of gravity (the centers of gravity of the photoelectric conversion portions 204 and 205).

Figure 6A:
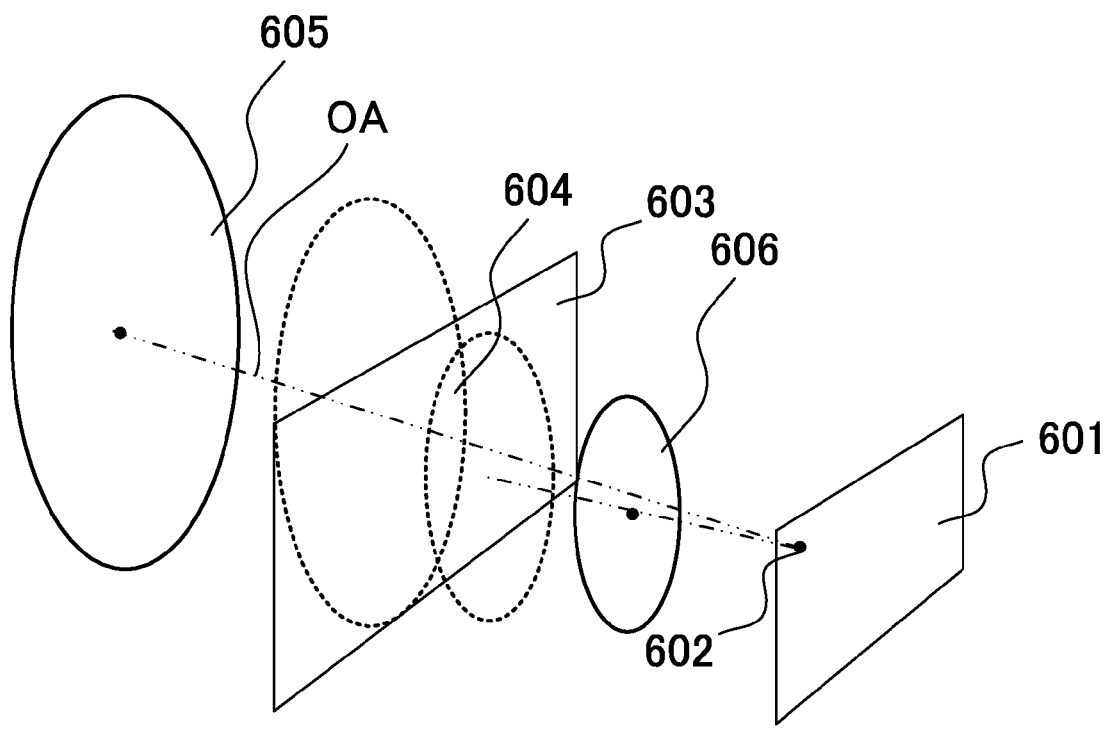
FIGS. 6A and 6B are diagrams of illustrating a shape of a vignetting as seen from the image pickup element in each of the embodiments.
Figure 6B:
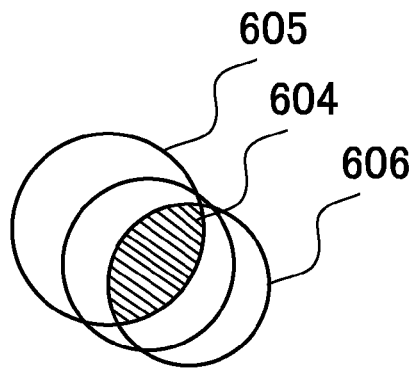

Subsequently, referring to FIGS. 6A and 6B, a vignetting will be described. FIG. 6A is a diagram of illustrating a position relation of a lens as seen from the image pickup element, and FIG. 6B is a diagram of illustrating a shape of the vignetting. In FIG. 6A, reference numeral 601 denotes a plane of the image pickup element, reference numeral 606 denotes a rear frame of the lens, and reference numeral 605 denotes a front frame of the lens. As seen from the center of the image pickup element (a center position of the image pickup element), the front lens of the lens, an aperture stop, and the rear lens of the lens are arrayed as a concentric circle around an optical axis OA, and therefore a light beam is blocked by the aperture stop (an aperture stop frame) that has the smallest radius. Accordingly, at the center position of the image pickup element, the shape of the aperture stop influences a light amount, the eccentricity (displacement) of the center of gravity of the pupil, or the like.

On the other hand, at a position 602 in the vicinity of a diagonal position of the image pickup element, the light beam is blocked by the front frame 605 of the lens and the rear frame 606 of the lens in addition to the aperture stop. Reference numeral 604 denotes a vignetting shape that is formed by projecting the front frame 605 of the lens and the rear frame 606 of the lens on an exit pupil (an exit pupil plane 603). In FIG. 6B, the vignetting shape 604 is indicated by a shaded portion. As seen from the position 602 in the vicinity of the diagonal position on the image pickup element, the vignetting shape 604 is recognized as a lemon-shaped form.

Figure 7:
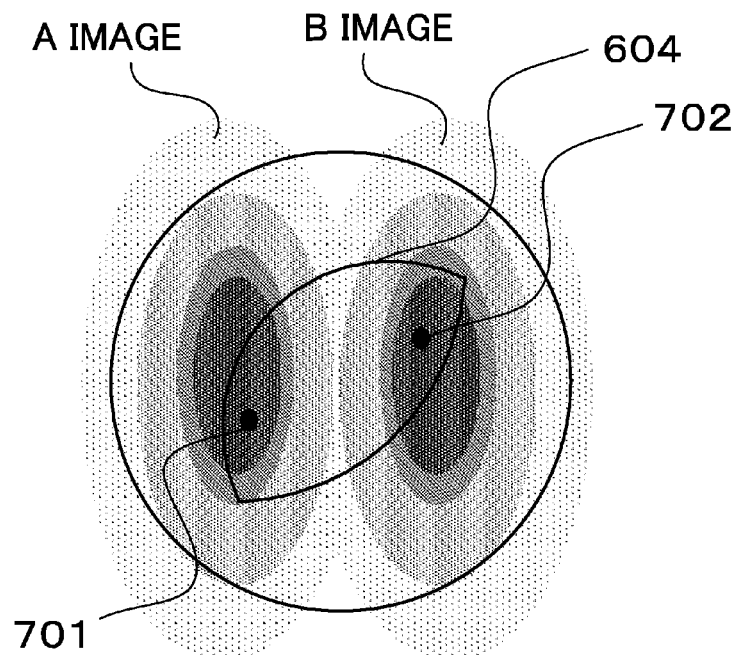
FIG. 7 is a diagram of illustrating a relation between the pupil intensity distribution and the shape of the vignetting in each of the embodiments.

Subsequently, referring to FIG. 7, a relation between pupil intensity distributions of the A image and the B image and the vignetting shape will be described. FIG. 7 is a diagram of illustrating the relation between the pupil intensity distributions and the vignetting shape, which illustrates centers of gravity of a region through which light can substantially pass in a state where the pupil intensity distributions of the A image and the B image are overlapped with the vignetting shape 604. In FIG. 7, reference numeral 701 denotes a center of gravity of the A image and reference numeral 702 denotes a center of gravity of the B image.

Due to the lemon-shaped vignetting shape 604 formed obliquely, light of the A image can be received only at the low side in FIG. 7, and light of the B image can be received only at the upper side, and thus the centers of gravity 701 and 702 are decentered (displaced) up and down. In other words, although the pupil intensity distribution as a structure of the pixel is pupil-divided to the left and right, it is actually pupil-divided in an oblique direction by the vignetting shape 604. Thus, since the pupil is divided in the oblique direction, a phase difference is generated in the oblique direction according to a defocus amount. Consequently, there is a possibility that a correct defocus amount cannot be calculated even when only a phase difference in a horizontal direction is detected.

Figure 8:
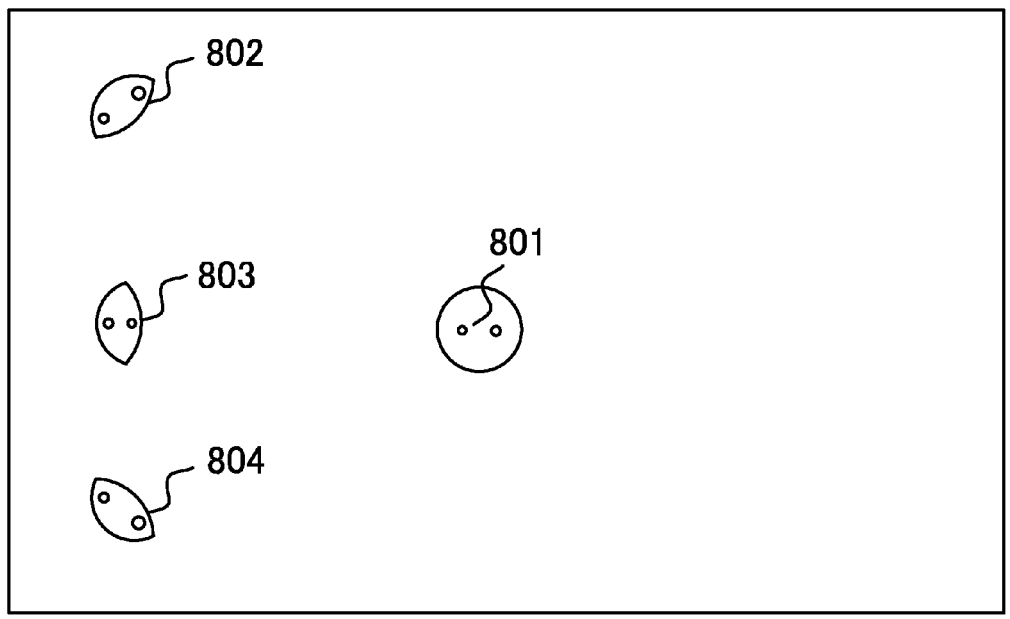
FIG. 8 is a diagram of illustrating a relation between a position on the image pickup element (a screen) and a pupil division state in each of the embodiments.

Subsequently, referring to FIG. 8, a relation between the position on the image pickup element (the screen) and the pupil division state will be described. FIG. 8 is a diagram of illustrating a relation between the position on the image pickup element (the screen) and the pupil division state. In FIG. 8, the pupil division state is illustrated in which the pupil is divided to the left and right at a position 801 in the vicinity of the center of the optical axis, and therefore a correct defocus amount can be detected if the phase difference in the horizontal direction is detected correctly.

Although the vignetting shape is a lemon shape at a position 803, the phase difference in the horizontal direction only needs to be detected since a pupil division direction is the horizontal direction. However, due to the influence of the vignetting, the base line length at the position 803 is shorter than that at the position 801. Since the pupil is divided in the oblique direction at a position 802, the phase difference in the oblique direction needs to be detected. The pupil at the position 804 is divided in an oblique direction opposite to the direction for the position 802. Thus, the pupil division direction and the base line length change depending on a position on the image pickup element and a state of an exit window of the lens.

Next, referring to FIGS. 11A to 11D, a case in which a pupil is divided in an oblique direction for a line in the oblique direction as an object will be described. FIG. 11A is an example of a case in which an object of an oblique line exists with respect to the focus detection field of view. Reference numeral 1101 denotes the focus detection field of view, reference symbol A denotes an object projected as an A image, and reference symbol B denotes an object projected as a B image. Since the base line length is in the oblique direction, the A image and the B image are projected to be shifted from each other by a defocus. A shifted distance between the A image and the B image (an image shift amount 1102) is different from an image shift amount 1103 captured in the focus detection field of view. Thus, in the example illustrated in FIG. 11A, the image shift amount 1103 that is larger than the actual image shift amount 1102 is detected.

FIG. 11B is an example in which a defocus and an image shift amount 1102 are the same as those in FIG. 11A. In FIG. 11B, however, an angle of the oblique line as the object is different from that in FIG. 11A. The object illustrated in FIG. 11B is an inclined object in an opposite direction compared to the object illustrated in FIG. 11A, and therefore the detected image shift amount 1103 is extremely small. An object illustrated in FIG. 11C is a V-shaped form. FIG. 11D illustrates an image where the V-shaped object illustrated in FIG. 11C is captured in focus detection fields of view 1104 and 1105. The focus detection field of view 1104 indicates the A image and the focus detection field of view 1105 indicates the B image. In the state of FIG. 11D, an image shift amount by which the A image and the B image coincide with each other cannot be detected.

Subsequently, referring to FIG. 10, a problem in a case where pixels are added in a vertical direction will be described. FIG. 10 is a diagram of illustrating a situation where a checked object exists in a focus detection field of view. In FIG. 10, reference numeral 1001 denotes a focus detection field of view. Reference numerals 1007, 1008, 1009, and 1010 are image signal waveforms of portions indicated by dashed-two dotted lines 1002, 1003, 1004, and 1005, respectively. Each of the image signal waveforms 1007, 1008, 1009, and 1010 contains an edge portion (a luminance edge), and therefore a phase difference between pupil-divided images can be correctly detected. Reference numeral 1006 is an image obtained by adding and averaging the signals in the focus detection fields of view. Reference numeral 1011 is an image signal waveform of the image 1006. The luminance edge which existed before signals in the focus detection fields of view are added is lost in the image signal waveform 1011 after the signals are added.

As described with reference to FIGS. 10 and 11, in the present embodiment, a correlation calculation of a two-dimensional image, instead of a one-dimensional image, is suitable. With respect to the correlation calculation of the two-dimensional image, similarly to the correlation calculation of the one-dimensional image, a method of using a sum of absolute differences, called SAD, is in practical use in motion vector detection or an image compression technology. Therefore, it is an algorithm rather suitable for hardware processing than software. The present embodiment detects a phase difference in an oblique direction, and therefore the same method as that of the motion vector detection for a two-dimensional image is used. Hereinafter, specific examples in the present embodiment will be described.

Embodiment 1

First of all, referring to FIG. 1, a defocus detection apparatus (an image pickup apparatus) will be described. FIG. 1 is a block diagram of an image pickup apparatus 100 in the present embodiment. In the image pickup apparatus 100, reference numeral 101 denotes a lens unit (an image pickup optical system) including a focus lens or an aperture stop mechanism. In the present embodiment, the image pickup apparatus 100 (an image pickup apparatus body) is configured integrally with the lens unit 101, but the embodiment is not limited to this. The present embodiment can also be applied to an image pickup system that is configured by the image pickup apparatus body and a lens unit removably mounted on the image pickup apparatus body.

Reference numeral 102 denotes an image pickup element (an image signal generating unit) that has a structure of a pixel illustrated for example in FIG. 2, which photoelectrically converts an object image (an optical image) obtained via an image pickup optical system. The image pickup element 102 is, as described above, includes a plurality of focus detection pixels that generate a pair of image signals based on light beams passing through pupil regions (partial regions in a pupil) different from each other in the lens unit 101 (the image pickup optical system). Reference numeral 103 denotes an A/D converter, which converts an output signal (an analog signal) of the image pickup element 102 into a digital signal.

Reference numeral 104 denotes an image signal adding unit (an AB-image adding unit), which adds image signals (A image signal and B image signal) from divided pixels that are output signals of the A/D converter 103. An output of the image signal adding unit 104 has a compatibility with respect to an output of a typical image pickup element having a Bayer array or the like. Reference numeral 105 denotes a signal processing unit (an image signal processing circuit), which performs predetermined signal processing on an image signal outputted from the image signal adding unit 104. Reference numeral 106 denotes a recording medium, which records a shot image (an image signal outputted from the signal processing unit 105).

Reference numeral 107 denotes an image signal separating unit (an AB-image separating unit), which separates and synchronizes the A image signal and the B image signal transmitted from the A/D converter 103 by a dot sequential system. Reference numeral 108 denotes a correlation calculating unit (a calculation unit). The correlation calculating unit 108 accumulates the A image signals and the B image signals (the pairs of image signals) outputted from the image signal separating unit 107 for one screen, and performs a correlation calculation for a focus detection region to calculate an image shift amount. In other words, the correlation calculating unit 108 calculates a phase difference in a pupil division direction (an image shift direction) by using a pair of image signals.

Reference numeral 109 denotes a microcomputer (a controller), which controls an entire system of the image pickup apparatus 100. The microcomputer 109 outputs an AF field of view position (a focus detection region) and vignetting information (information relating to the image pickup optical system) to a pupil division state detecting unit 110. The pupil division state detecting unit 110 detects (calculates) a base line length and a pupil separation angle (a pupil division direction) based on the information, and outputs the base line length and the pupil division angle to the microcomputer 109. The microcomputer 109 outputs the information relating to the AF field of view position and shift searching direction to the correlation calculating unit 108. The correlation calculating unit 108 outputs an image shift amount calculated based on the information to the microcomputer 109.

Reference numeral 110 denotes a pupil division detecting unit (a detection unit). The pupil division detecting unit 110 detects a base line length of a plurality of focus detection pixels and a pupil division direction, based on position information of the focus detection region in the image pickup element 102 and information relating to the lens unit 101 (vignetting information).

Figure 9:
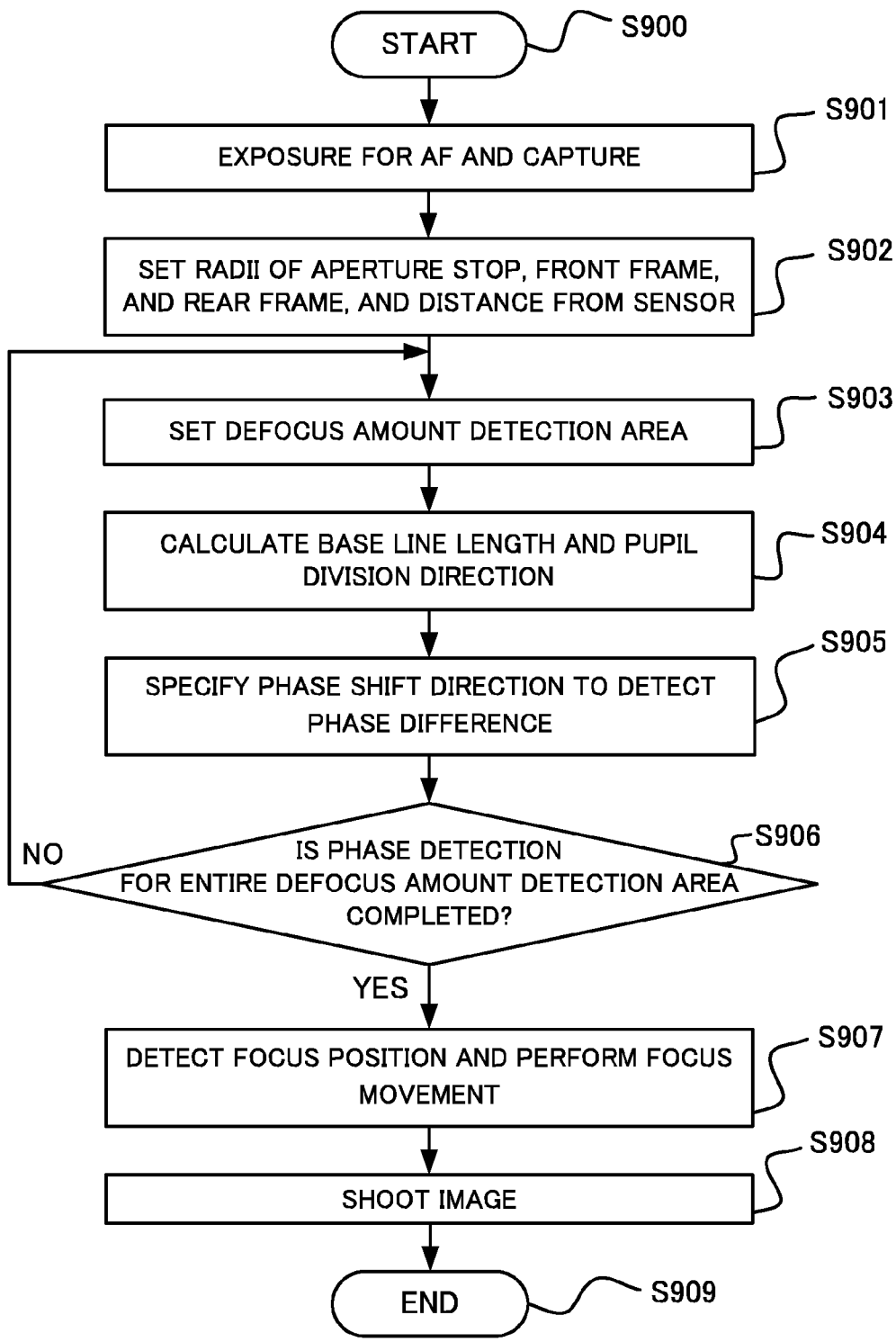
FIG. 9 is a flowchart of illustrating a shooting flow of the image pickup apparatus in Embodiment 1.

Next, referring to FIG. 9, a flow of taking an image using the image pickup apparatus 100 (a method of controlling the image pickup apparatus) of the present embodiment will be described. FIG. 9 is a flowchart of illustrating the flow of taking an image using the image pickup apparatus 100 (a shooting sequence). Each step of FIG. 9 is performed mainly by an instruction of the microcomputer 109.

First of all, the image pickup apparatus 100 starts the shooting sequence in Step S900, and then performs exposure and capture for the focus detection (AF) in Step S901. In this case, the A/D converter 103 performs the A/D conversion on a signal exposed by the image pickup element 102. Then, the A image signal and the B image signal separated by the image signal separating unit 107 are inputted to the correlation calculating unit 108. In Step S901, the image signal adding unit 104, the signal processing unit 105, and the recording medium 106 do not operate.

Subsequently, in Step S902, the microcomputer 109 sets radii of the aperture stop, the front frame, and the rear frame, and distances from a sensor (the image pickup element 102) to them, i.e. information relating to the lens unit 101 (the image pickup optical system). The information is calculated by the microcomputer 109, or alternatively may be set by a user. Then, the microcomputer 109 transfers, to the pupil division state detecting unit 110, the radii of the aperture stop, the front frame, and the rear frame, and the distances from the sensor to them (the information relating to the image pickup optical system). In the present embodiment, the information relating to the image pickup optical system is information based on a size of the image pickup optical system (the radii of the aperture stop, the front frame and the rear frame of the lens) and the distances from the image pickup element 102 to them (exit window information), but the embodiment is not limited to this.

Subsequently, in Step S903, the microcomputer 109 sets a defocus amount detection area (the focus detection region). Then, the microcomputer 109 transfers defocus detection area information (information relating to the focus detection region) to the correlation calculating unit 108 and the pupil division state detecting unit 110.

Subsequently, in Step S904, the pupil division state detecting unit 110 detects the base line length of the plurality of focus detection pixels (a focus detection portion) and the pupil division direction, based on position information of the focus detection region in the image pickup element 102 and the information relating to the image pickup optical system. In the present embodiment, the position information of the focus detection region is image height information of the focus detection region (information relating to a height in a screen, i.e. a height from a center of the image pickup element (an optical axis center)). Thus, the pupil division state detecting unit 110 calculates the base line length and the pupil division direction by using the exit window information and the pupil intensity distribution.

Specifically, the pupil division state detecting unit 110 calculates the vignetting shape 604 projected on the exit pupil plane 603 by a geometric calculation, based on the position 602 and the information relating to the front lens 605 of the lens and the rear lens 606 of the lens (the information relating to the image pickup optical system) illustrated in FIG. 6. Then, the pupil division state detecting unit 110 cuts the pupil intensity distribution projected on the exit pupil plane 603 by the vignetting shape 604 to obtain a center of gravity of the sensitivity.

When the center of gravity of the sensitivity is obtained based on the pupil intensity distributions of the A image and the B image, the base line length and the pupil division direction are calculated. In other words, the base line length of the plurality of focus detection pixels is calculated based on a distance between centers of gravity of the sensitivities of the plurality of focus detection pixels determined based on the pupil intensity distributions of the plurality of focus detection pixels and the information relating to the image pickup optical system. The pupil division direction is a direction which is parallel to a line connecting the centers of gravity of the sensitivities of the plurality of focus detection pixels. The base line length and the pupil division angle calculated by the pupil division state detecting unit 110 are outputted to the microcomputer 109.

Subsequently, in Step S905, the microcomputer 109 specifies a phase shift direction (the pupil division direction), and the correlation calculating unit 108 detects (calculates) the phase difference in the pupil division direction by using the pair of image signals. In this case, the microcomputer 109 sets the pupil division direction (the pupil division angle) to the correlation calculating unit 108 so as to instruct the correlation calculating unit 108 to perform a search in the pupil division direction. The correlation calculating unit 108 performs the correlation calculation by using the pupil division angle set by the microcomputer 109.

Figure 12A:
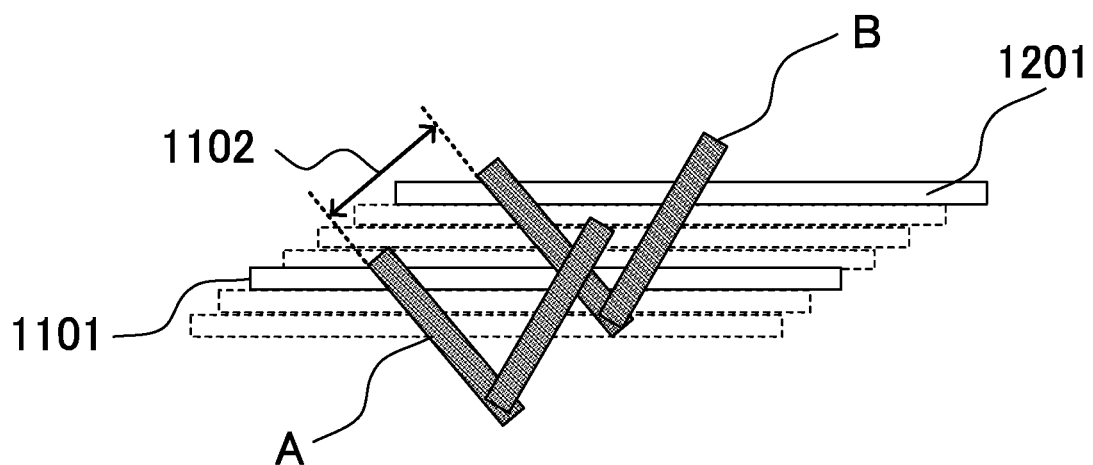
FIGS. 12A and 12B are diagrams of describing a correlation calculation method in Embodiment 1.
Figure 12B:
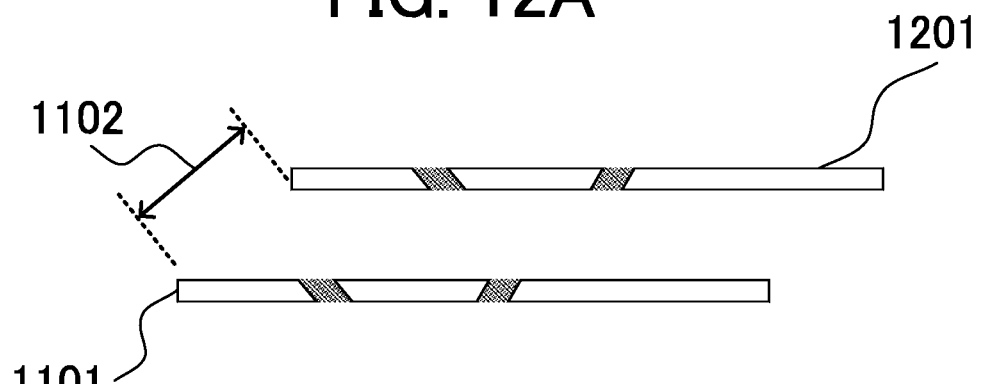

Referring to FIGS. 12A and 12B, the correlation calculation using the pupil division direction (the pupil division angle) will be described. FIGS. 12A and 12B are diagrams of describing a correlation calculating method in the present embodiment. In FIG. 12A, "A" is a V-shaped object which is projected on an A image field of view (an A image pixel), and "B" is an object, which is the same as the object A, projected on a B image field of view (a B image pixel). Reference numeral 1101 denotes the A image field of view. FIG. 12B is a diagram of an extracted image which is projected on the A image field of view 1101.

Conventionally, the A image field of view was used also for the B image. In the correlation calculation of the present embodiment, however, the correlation calculation is performed sequentially for the field of view indicated by dotted lines in FIG. 12A while searching a portion corresponding to the A image field of view 1101, and a degree of coincidence is evaluated. In the present embodiment, the B image field of view is shifted in an oblique direction with respect to the A image field of view, and its direction is the pupil division direction or a direction which is determined depending on the pupil division direction. An arrow 1102 indicates a direction and a distance in which the image is actually shifted according to the pupil division. In the present embodiment, a location where the degree of coincidence of the pair of image signals is maximized is searched along the direction of the arrow 1102 (the pupil division direction).

Reference numeral 1201 is the B image field of view where the degree of coincidence with the A image field of view 1101 is maximized.

FIG. 12B illustrates an image projected on each of the A image field of view 1101 and the B image field of view 1201 where the degree of coincidence with the A image field of view 1101 is highest. Obtaining the phase difference by a subpixel unit using correlation amounts before and after reaching the location where the degree of coincidence is highest is similar to a well-known phase difference method. The correlation calculating unit 108 multiplies a coefficient determined depending on the base line length by the phase difference obtained as described above, and thus it can calculate a defocus amount (an image shift amount).

Subsequently, in Step S906 of FIG. 9, the microcomputer 109 determines whether or not the phase difference detection for the entire focus detection area (the focus detection region) is completed. When the phase difference detection for the entire focus detection area is not completed, the flow returns to Step S903, and Steps S903 to S906 are repeated. On the other hand, when it is determined that the phase difference detection for the entire focus detection area is completed in Step S906, i.e. when the image shift amount is obtained, the flow proceeds to Step S907.

In Step S907, the microcomputer 109 detects a focus position for the object (main object) and moves the lens unit 101 to perform a focus control. In other words, the microcomputer 109 (the controller) performs the focus control so that the image shift amount calculated by the correlation calculating unit 108 decreases. Subsequently, in Step S908, the microcomputer 109 controls the image signal adding unit 104, the signal processing unit 105, the recording medium 106, and the like, to shoot an image.

As a result, in the present embodiment, the influence of the vignetting, the base line length, and the pupil division direction are calculated based on an optical condition. Then, a phase shift detection direction is determined according to the calculated influence of the vignetting, the base line length, and the pupil division direction to perform the phase difference detection.

Embodiment 2

Figure 3:
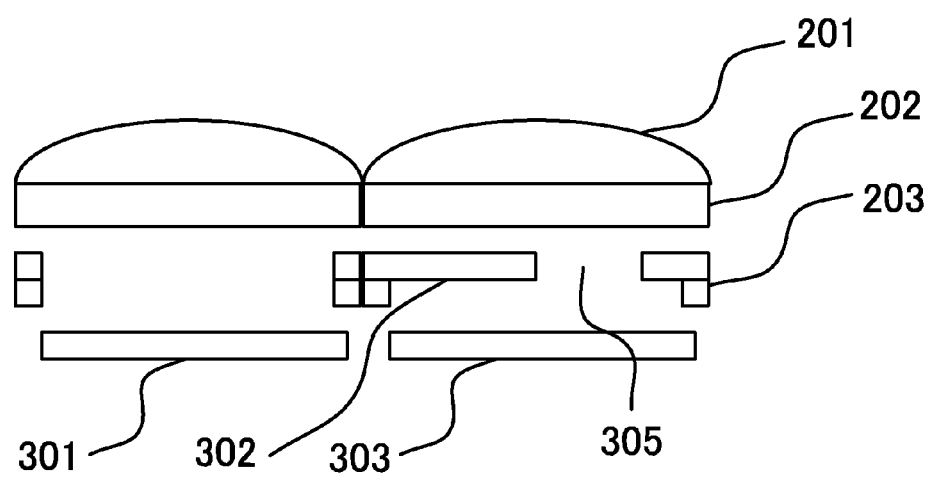
FIG. 3 is a cross-sectional view of pixels of an image pickup element in Embodiment 2.

Next, a defocus detection apparatus (an image pickup apparatus) in Embodiment 2 of the present invention will be described. First of all, referring to FIG. 3, a structure of pixels of an image pickup element in the present embodiment will be described. FIG. 3 is a cross-sectional view of the pixels of the image pickup element in the present embodiment. Reference numeral 201 denotes a microlens, reference numeral 202 denotes a color filter, and reference numeral 203 denotes a wiring layer. Reference numeral 301 denotes a pixel (an image pickup pixel) which is used to generate a normal image signal. Reference numeral 303 denotes a pixel (a focus detection pixel) which is used to generate a focus detection signal. Reference numeral 302 denotes a light blocking portion which extends the wiring layer 203 to an upper portion of the pixel to block the light. With respect to the pixel 303 illustrated in FIG. 3, light enters the pixel 303 only through an opening portion 305 at the right side, and therefore the pixel 303 is in a state where it does not have sensitivity at the left side in the pixel 303, which is in a state where a pupil is decentered (displaced).

Figure 4:
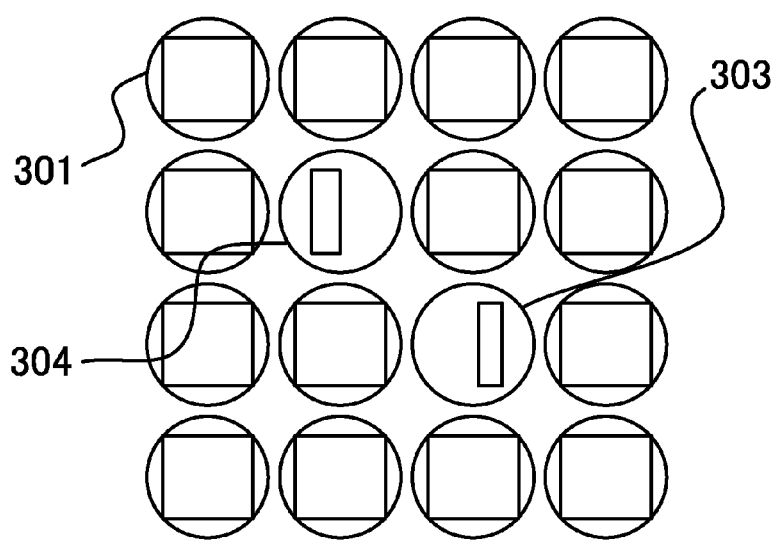
FIG. 4 is a pixel array diagram of the image pickup element in Embodiment 2.

FIG. 4 is a pixel array diagram as seen from a front side of the image pickup element in the present embodiment. Reference numeral 301 denotes a normal pixel (an image pickup pixel), and reference numerals 303 and 304 denote pixels (focus detection pixels) that generate focus detection signals. The image pickup element of the present embodiment is different from that of Embodiment 1 in that the pupil-divided pixels (the focus detection pixels) are arranged discretely. In the present embodiment, similarly to Embodiment 1, there is an influence caused by the vignetting, and therefore the pupil division state changes depending on an image height or a position or a size of the lens.

Figure 13A:
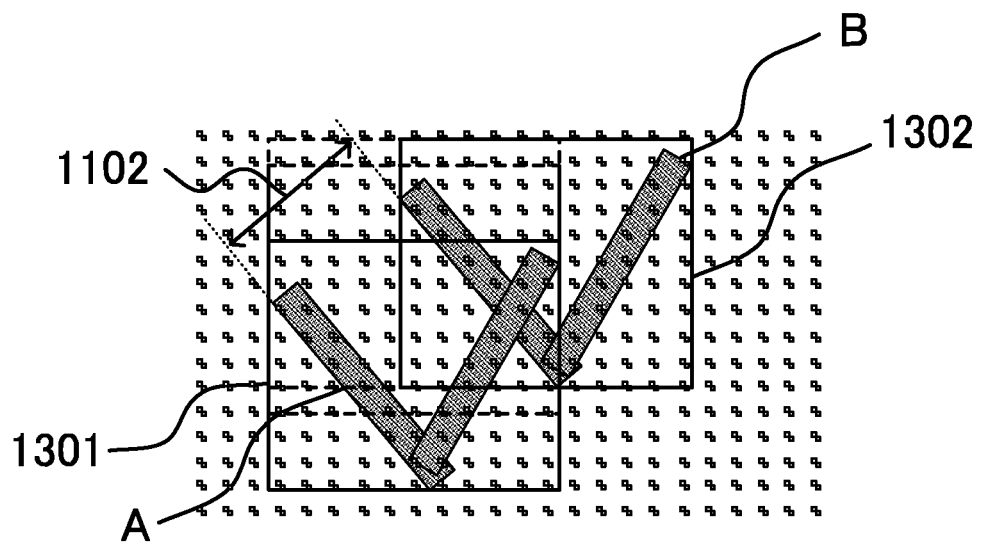
FIGS. 13A and 13B are diagrams of describing a correlation calculation method in Embodiment 2.
Figure 13B:
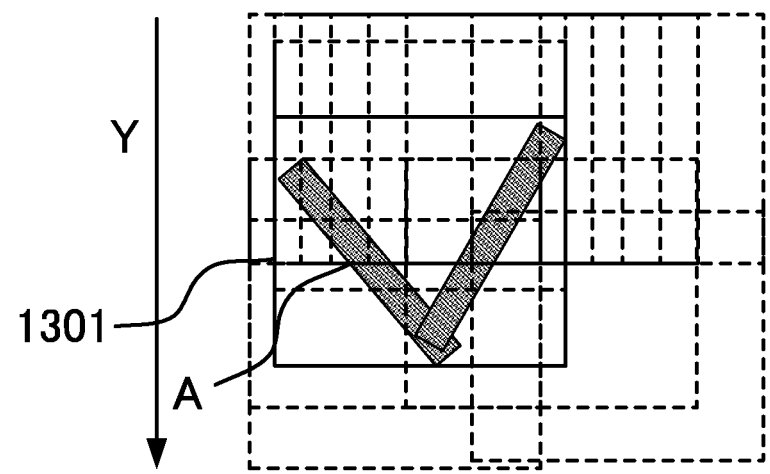

Subsequently, referring to FIGS. 13A and 13B, a correlation calculation in the present embodiment will be described. FIGS. 13A and 13B are diagrams of describing a correlation calculation method in the present embodiment. FIG. 13A illustrates focus detection pixels arranged discretely and a V-shaped object which is projected on the A image pixel and the B image pixel. Reference numeral 1301 denotes a field of view of the A image pixel. The field of view (an image) in the present embodiment has two dimensions (a two-dimensional image). In the present embodiment, however, since the focus detection pixels are arranged discretely, each of the A image and the B image actually obtained is a small image like a reduced image with respect to an image pickup image.

FIG. 13B illustrates a searching direction in the present embodiment. In the present embodiment, when searching a location where a degree of coincidence of the B image field of view is high with respect to the A image field of view, a combination of constant widths in a longitudinal direction and in a lateral direction is a search range, instead of using a pupil division direction previously calculated. In other words, a correlation calculating unit 108 (a calculation unit) of the present embodiment searches a location where a degree of coincidence of a pair of image signals is maximized along a first direction and a second direction different from the first direction to perform a two-dimensional correlation calculation, and thus it calculates a phase difference and a direction of the phase difference.

By using this searching method, a circuit which is common to a motion vector detecting circuit can be used in a manner of time division. Therefore, the scale of circuits can be reduced. In addition, for example, since the searching can start before the calculation result of Step S904 in FIG. 9 is obtained, a calculation time can be reduced by performing a parallel calculation.

Preferably, the microcomputer 109 (a determination unit) performs the two-dimensional correlation calculation to detect the phase difference, and then determines whether or not the direction of the phase difference coincides with the pupil division direction. In the present embodiment, the two-dimensional correlation calculation is performed to be able to decrease a probability of error detection compared to a one-dimensional correlation calculation, and it is more preferred that the generation of the error detection is detected by using the pupil division state (the pupil division direction). Thus, in the present embodiment, the phase difference detected by using the two-dimensional correlation calculation is compared to the detection result of the pupil division state to perform an error determination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although the SAD (Sum of Absolute Difference) is used as the correlation calculation method in each embodiment, each embodiment is not limited to this and a similar effect can be obtained even when a different kind of correlation values capable of detecting the phase difference is used. Although the method in each embodiment is used as a part of a so-called autofocus function in which a focusing lens is driven to be focused on the object as a result of the defocus detection, it may also be used for obtaining a distance map and as a result it may be applicable for a photometry, a colorimetry, or the like for each obtained distance. In addition, in each embodiment, although the correlation calculation method is performed by the image pickup apparatus, each embodiment is not limited to this and the method may also be applicable for a technology of making a distance map by using a post-processing apparatus (a signal processing apparatus) such as a personal computer which processes shot image data. For example, the microcomputer 109 (the controller) adds, to an image, information relating to a depth direction of an object based on an image shift amount.

In each embodiment, the image pickup element is used as an image signal generating unit which generates a pair of image signals to perform the pupil division, but each embodiment is not limited to this. For example, the same effect as that of each embodiment can be obtained even in a system of performing spectrometry and pupil division using a relay lens for a light beam from one image pickup lens. In each embodiment, the pupil division state (the pupil division direction) is detected by the geometric calculation, and the similar effect can be obtained even when using a previously calculated table corresponding to a control of a lens.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment described above, an image pickup apparatus, an image pickup system, a signal processing apparatus, and a non-transitory computer-readable storage medium which are capable of performing highly-accurate focus detection while avoiding an influence caused by a shape of an object or vignetting can be provided.

This application claims the benefit of Japanese Patent Application No. 2013-047442, filed on Mar. 11, 2013, which is hereby incorporated by reference herein in its entirety.

What is claimed is:

1. An image pickup apparatus comprising:
   an image pickup element including a plurality of focus detection pixels configured to generate a pair of image signals based on light beams passing through pupil regions different from each other in an image pickup optical system;
   a detector configured to detect a base line length of the plurality of focus detection pixels and a pupil division direction based on position information of a focus detection region in the image pickup element and information relating to the image pickup optical system; and
   a calculator configured to calculate a phase difference in the pupil division direction by using the pair of image signals,
   wherein the calculator multiplies a coefficient determined depending on the base line length by the phase difference to calculate an image shift amount.

2. The image pickup apparatus according to claim 1, wherein:
   the position information of the focus detection region includes image height information of the focus detection region, and
   the information relating to the image pickup optical system includes exit window information based on a size of the image pickup optical system and a distance from the image pickup element.

3. The image pickup apparatus according to claim 1, wherein the base line length of the plurality of focus detection pixels is detected based on a distance of centers of gravity of sensitivities of the plurality of focus detection pixels determined based on a pupil intensity distribution in the plurality of focus detection pixels and the information relating to the image pickup optical system.

4. An image pickup apparatus comprising:
   an image pickup element including a plurality of focus detection pixels configured to generate a pair of image signals based on light beams passing through pupil regions different from each other in an image pickup optical system;
   a detector configured to detect a base line length of the plurality of focus detection pixels and a pupil division direction based on position information of a focus detection region in the image pickup element and information relating to the image pickup optical system; and
   a calculator configured to calculate a phase difference in the pupil division direction by using the pair of image signals,
   wherein the base line length of the plurality of focus detection pixels is detected based on a distance of centers of gravity of sensitivities of the plurality of focus detection pixels determined based on a pupil intensity distribution in the plurality of focus detection pixels and the information relating to the image pickup optical system, and
   wherein the pupil division direction is a direction that is parallel to a line connecting the centers of gravity of the sensitivities of the plurality of focus detection pixels.

5. The image pickup apparatus according to claim 1, further comprising a controller configured to perform a focus control so that the image shift amount calculated by the calculator decreases.

6. The image pickup apparatus according to claim 1, wherein the calculator searches a location where a degree of coincidence of the pair of image signals is maximized along the pupil division direction to calculate the phase difference.

7. The image pickup apparatus according to claim 1, wherein the calculator searches a location where a degree of coincidence of the pair of image signals is maximized along a first direction and a second direction different from the first direction to perform a two-dimensional phase calculation to calculate the phase difference and a direction of the phase difference.

8. The image pickup apparatus according to claim 7, further comprising a determiner configured to determine whether or not the direction of the phase difference coincides with the pupil division direction.

9. An image pickup system comprising:
   an image pickup optical system;
   an image pickup element including a plurality of focus detection pixels configured to generate a pair of image signals based on light beams passing through pupil regions different from each other in the image pickup optical system;
   a detector configured to detect a base line length of the plurality of focus detection pixels and a pupil division direction on position information of a focus detection region in the image pickup element and information relating to the image pickup optical system; and
   a calculator configured to calculate a phase difference in the pupil division direction by using the pair of image signals,
   wherein the calculator multiplies a coefficient determined depending on the base line length by the phase difference to calculate an image shift amount.

10. A signal processing apparatus comprising:
    an image signal generator configured to generate a pair of image signals based on light beams passing through pupil regions different from each other in an image pickup optical system;
    a detector configured to detect a base line length of a focus detection portion and a pupil division direction based on position information of a focus detection region and information relating to the image pickup optical system; and
    a calculator configured to calculate a phase difference in the pupil division direction by using the pair of image signals,
    wherein the calculator multiplies a coefficient determined depending on the base line length by the phase difference to calculate an image shift amount.

11. The signal processing apparatus according to claim 10, further comprising a controller configured to add, to an image, information relating to a depth direction of an object based on the image shift amount.

12. A non-transitory computer-readable storage medium storing a program, the program causes a computer to execute a process comprising:
    generating a pair of image signals based on light beams passing through pupil regions different from each other in an image pickup optical system;
    detecting a base line length of a focus detection portion and a pupil division direction based on position information of a focus detection region and information relating to the image pickup optical system; and
    calculating a phase difference in the pupil division direction by using the pair of image signals,
    wherein in the calculating step, a coefficient determined depending on the base line length is multiplied by the phase difference to calculate an image shift amount.

13. A signal processing apparatus comprising:
    an image signal generator configured to generate a pair of image signals based on light beams passing through pupil regions different from each other in an image pickup optical system;
    a detector configured to detect a base line length of a focus detection portion and a pupil division direction based on position information of a focus detection region and information relating to the image pickup optical system; and
    a calculator configured to calculate a phase difference in the pupil division direction by using the pair of image signals,
    wherein the calculator searches a location where a degree of coincidence of the pair of image signals is maximized along the pupil division direction to calculate the phase difference.

\* \* \* \* \*